R. O. VANDERCOOK.
NON-SLIP DRIVING MEANS.
APPLICATION FILED JUNE 16, 1921.
1,399,329. Patented Dec. 6, 1921.
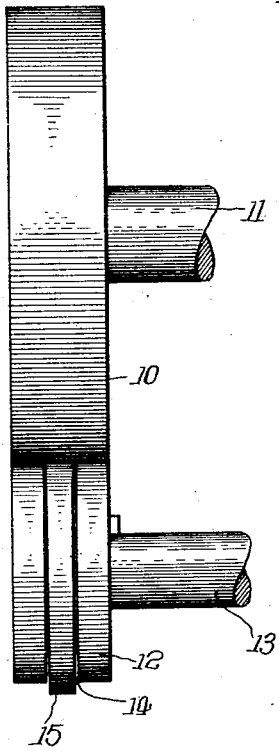
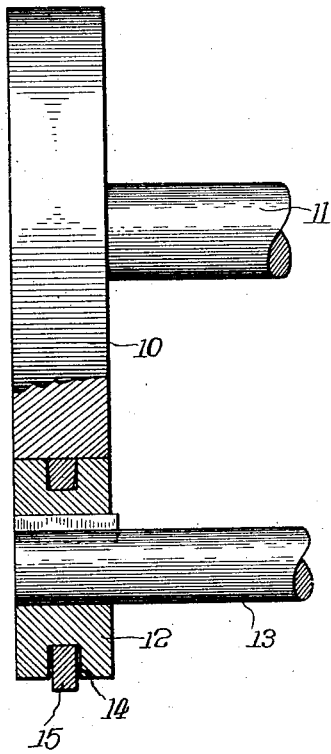
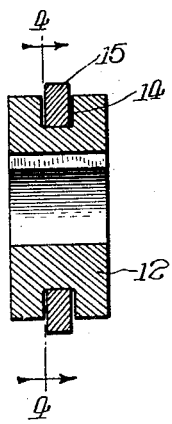
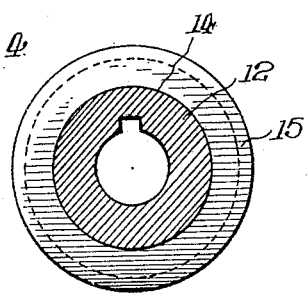
Inventor:
Robert O. Vandercook,
By Charles J. Schmidt.
Atty.
Witness:
A. J. Sauser.

UNITED STATES PATENT OFFICE.

ROBERT O. VANDERCOOK, OF EVANSTON, ILLINOIS.

NON-SLIP DRIVING MEANS.

1,399,329.  Specification of Letters Patent.  Patented Dec. 6, 1921.

Application filed June 16, 1921. Serial No. 477,954.

*To all whom it may concern:*

Be it known that I, ROBERT O. VANDERCOOK, a citizen of the United States, and a resident of Evanston, in the county of Cook and State of Illinois, have invented certain new and useful Improvements in Non-Slip Driving Means, of which the following is a specification.

My invention relates to improved non-slip driving means, particularly desirable and useful for preventing slip between the smooth surfaces of members which are in driving engagement. Relatively rolling members with smooth engaging surfaces are sometimes used where gear teeth or other non-slip means would be impractical and undesirable, and frequently spring means are resorted to to hold the surfaces together. For example, in the inking mechanism generally used on job printing presses, metal wheels or trucks roll on metal surfaces or rails, spring pressure being applied to hold the rollers against the rails. The rollers and rails are of solid metal and slippage may readily occur. Sometimes rosin or other friction material is applied to the surfaces to prevent slipping, and sometimes a rubber or other elastic tire is applied around the wheel the full width thereof. Where the pressure between the relatively rolling member varies, rubber tires extending full width are impractical as their give or yield permits variation in the distance between the axis of the roller and the surface engaged thereby, such variations being frequently undesirable.

The main object of my invention is to provide friction means in the form of a resilient belt so applied on the roller or on the surface with which the roller coöperates that the metallic surfaces of the members may at all times be in contact but held against slipping by the engagement of the non-slip belt with the members. This I accomplish by placing the non-slip belt in a groove in which it may be compressed sufficiently to permit contact between the driving surfaces at all times to thus prevent variation in the distance between the members.

On the accompanying drawing my invention is clearly illustrated. On the drawing—

Figure 1 is a plan view of a cylindrical wheel and cylindrical roller having smooth cylindrical engaging surfaces with the anti-friction belt applied to one of the members, Fig. 2 is a similar view with the members in vertical diametrical section, Fig. 3 is a vertical diametrical sectional view of the roller removed from the wheel and Fig. 4 is a sectional view on plane 4—4, Fig. 3.

In the arrangement shown the cylindrical wheel 10 is secured on the shaft 11 and the cylindrical roller 12 is secured on the shaft 13 parallel with the shaft 11. The roller 12 has the peripheral slot 14 shown as of rectangular cross section in which slot is seated the annular belt 15 which is also of rectangular cross section with an outer diameter greater than the outer diameter of the roller. The groove is of sufficient depth and width and the belt is of sufficient cross sectional dimension and strength to exert the required non-slip effort when the metallic cylindrical surfaces of the wheel and roller are in engagement. The metallic members will then take up the pressure and load and the belt will prevent slippage thus insuring accurate transmission between the members. Where springs are provided for holding the metal surfaces in engagement the belt should be of such dimension and arrangement that at the lowest spring pressure or pull the belt may be compressed sufficiently to permit the members to maintain their metallic contact. In printing presses where the rollers or trucks travel over rails under variable spring pressure or pull the arrangement should be such that the belt may sufficiently compress under lowest spring effect to permit engagement between the metallic surfaces. In the ordinary arrangement in printing presses the rollers or trucks soon wear because of the slipping and pounding on the rails. However by applying the non-slip belt such wear is prevented and the engaging surfaces will remain true and more efficient and accurate work can be accomplished.

It is evident that several belts could be applied on one of the members or that each member could be provided with a belt, so long as the arrangement is such that the belts will sufficiently compress at all times to permit the metallic surfaces to remain in contact. On printing presses the rails could be provided with slots and non-slip strips projecting therefrom a sufficient distance to be compressed to permit the roller to engage the metallic surface of the rails and to prevent slipping. The groove and belt instead of being of rectangular cross section could be of circular or other cross section. The belt is preferably of rubber or other equally elastic and resilient material so that when a belt is worn, it can readily be stretched and removed from the wheel and another belt applied.

The broad feature of my invention is the provision of elastic non-slip friction material and space into which it can be compressed by coöperating members so as to permit the metallic or hard surfaces of the members to always engage, and to exert sufficient frictional engagement between the members to prevent slippage.

I claim as follows:

1. The combination with two members having rolling engagement and continuously in contact, one of said members having a depression, of elastic friction material in said depression to be compressed during engagement of said members to prevent slippage between them.

2. The combination of two members having rolling engagement, one of said members having a continuous groove open at the periphery thereof, and elastic friction material in said groove normally projecting beyond the periphery to be compressed into the groove when said members are in rolling engagement to thereby exert frictional engagement between the members to prevent the engaging surfaces of the members from slipping.

3. The combination of two relatively rolling members having comparatively hard engaging surfaces, elastic friction material between said members, and space into which said material is compressed to permit engagement of the surfaces of the members and to prevent slip between such surfaces.

4. The combination of two relatively rolling members having engaging surfaces, an elastic belt of friction material between the members, and a groove in one of said members into which said belt is compressed during relative rolling of said members whereby the engaging surfaces of said members will at all times be in contact and slipping between the members prevented.

5. The combination of two members of hard material having cylindrical engaging surfaces, one of said members having a peripheral groove, and a belt of elastic friction material in said groove, said belt being compressed in said groove to permit engagement of the surfaces of said members and to prevent relative slip of the members.

6. A non-slip roller having an engaging surface, said roller having a peripheral groove, a belt of elastic friction material in said groove and projecting a distance beyond the engaging surface to be compressed to exert non-slip connection between said roller and a member engaged by the roller surface.

7. A non-slip driving member having an engaging surface for taking up the pressure when said driving member is applied to a member to be driven, said member having a groove open at said engaging surface, and elastic friction material in said groove adapted to be compressed when said driving member is brought with its engaging surface into engagement with a member to be driven to prevent slip between said members.

In witness whereof, I hereunto subscribe my name this 11th day of June A. D., 1921.

ROBERT O. VANDERCOOK.